United States Patent
Murata et al.

(10) Patent No.: US 6,792,805 B2
(45) Date of Patent: Sep. 21, 2004

(54) CAPACITIVE ACCELERATION SENSOR

(75) Inventors: Minoru Murata, Obu (JP); Minekazu Sakai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/369,198

(22) Filed: Feb. 20, 2003

(65) Prior Publication Data

US 2003/0164043 A1 Sep. 4, 2003

(30) Foreign Application Priority Data

Feb. 21, 2002 (JP) ........................................ 2002-045174

(51) Int. Cl.$^7$ .......................................... G01P 15/125
(52) U.S. Cl. .................................................. 73/514.32
(58) Field of Search ....................... 73/514.32, 514.36, 73/504.14, 504.16, 1.37, 1.38; 310/311

(56) References Cited

U.S. PATENT DOCUMENTS

| | | | | |
|---|---|---|---|---|
| 5,095,750 A | * | 3/1992 | Suzuki et al. ............. | 73/514.19 |
| 5,211,051 A | * | 5/1993 | Kaiser et al. ................ | 73/1.38 |
| 5,353,641 A | * | 10/1994 | Tang ......................... | 73/517 R |
| 5,572,057 A | * | 11/1996 | Yamamoto et al. ......... | 257/417 |
| 5,847,280 A | | 12/1998 | Sherman et al. | |
| 5,914,553 A | * | 6/1999 | Adams et al. .............. | 310/309 |
| 6,035,694 A | * | 3/2000 | Dupuie et al. ............... | 73/1.38 |
| 6,151,966 A | | 11/2000 | Sakai et al. | |
| 6,318,177 B2 | | 11/2001 | Buchan et al. | |

* cited by examiner

*Primary Examiner*—Helen Kwok
(74) *Attorney, Agent, or Firm*—Posz & Bethards, PLC

(57) ABSTRACT

A capacitive acceleration sensor includes a supporting substrate, a movable member, and two fixed members. The movable member moves in response to a force that acts on the movable member. Each fixed member is stationary under the force. Two capacitances are formed between the movable member and the fixed members. One of the capacitances increases while the other decreases when the movable member moves in response to the force. The force includes a substantially constant force and a variable force when an acceleration is measured using the sensor. The variable force is proportional to the acceleration. The acceleration is measured on the basis of the difference between the capacitances. The capacitances are different from each other when the force that acts on the movable member is zero to reduce the difference between the capacitances that corresponds to the substantially constant force.

20 Claims, 5 Drawing Sheets

CAPACITIVE ACCELERATION SENSOR

CROSS REFERENCE TO RELATED APPLICATION

This application is based on and incorporates herein by reference Japanese Patent Application No. 2002-45174 filed on Feb. 21, 2002.

BACKGROUND OF THE INVENTION

The present invention relates to a capacitive acceleration sensor that measures an acceleration using two capacitances that exclusively increase or decrease in response to the acceleration.

FIG. 6 is a plan view of a proposed capacitive acceleration sensor of this type. The sensor in FIG. 6 includes a supporting substrate 11, which is not illustrated in FIG. 6, fixed members 30, 40, and a movable member 20. The fixed members 30, 40 are located above a surface of the supporting substrate 11. The fixed members 30, 40 are supported by the supporting substrate 11 to be stationary with respect to the supporting substrate 11. The movable member 20 is also located above the surface. The movable member 20 is supported by the supporting substrate 11 to be movable with respect to the supporting substrate 11. The fixed and movable members 20, 30, 40 are formed from a semiconductor layer, which has been formed on the supporting substrate 11, by etching the layer to form a trench.

The movable member 20 includes a weight 21, which is mechanically and electrically linked to spring members 22. The movable member 20 can move along directions Y in FIG. 6, which is parallel to the surface of the supporting substrate 11, in response to the acceleration of the sensor with the spring-like action of the spring members 22. The movable member 20 also includes comb-shaped electrodes 24. The comb-shaped electrodes 24 are respectively located on left and right ends of the weight 21 in FIG. 6. Each comb-shaped electrode 24 includes four movable electrode beams, which are substantially-straight. As shown in FIG. 6, the comb-shaped electrodes 24 are substantially symmetrical with respect to the weight 21.

On the other hand, each fixed member 30, 40 includes a comb-shaped fixed electrode 32, 42, which is interleaved with each corresponding movable electrode 24, as shown in FIG. 6. Each fixed electrode 32, 42 includes four fixed electrode beams, which are substantially-straight. As shown in FIG. 6, there is a left clearance d1' between the left movable electrode 24 and the left fixed electrode 32, more specifically between each left movable electrode beam and the corresponding left fixed electrode beam, and a left capacitance CS1 is formed between the left movable electrode 24 and the left fixed electrode 32. On the other hand, there is a right clearance d2' between the right movable electrode 24 and the right fixed electrode 42, more specifically between each right movable electrode beam 24 and the corresponding right fixed electrode beam 42, and a right capacitance CS2 is formed between the right movable electrode 24 and the right fixed electrode 42.

The movable electrodes 24 move along the directions Y with the weight 21 in response to a force that acts on the movable member 20 along the directions Y. In the proposed sensor, when the force is zero, the left and right clearance d1', d2' are substantially equal to each other and so are the left and right capacitances CS1, CS2. In addition, when the movable electrodes 24 move, the capacitances CS1, CS2 change in a manner that one of the capacitances CS1, CS2 increases while the other decreases. Moreover, the force can be correlated to an acceleration of the sensor. Therefore, the acceleration can be measured based on the difference (CS1−CS2) between the capacitances CS1, CS2.

The proposed capacitive acceleration sensor is used, for example, in an automobile, in which the sensor is mounted such that the surface of the supporting substrate 11 is approximately horizontal to the ground. Therefore, the force that acts on the movable member 20 along the directions Y is in direct proportion to the acceleration of the automobile. There is a need today, however, to use a capacitive acceleration sensor for measuring an acceleration in the vertical directions to the ground. When the proposed capacitive acceleration sensor is used for such an application, the proposed sensor needs to be attached on an object, the acceleration of which is being measured, such that the surface of the supporting substrate 11 is approximately vertical to the ground.

In that case, when an acceleration is measured using the sensor, the force includes a substantially constant force, which is caused by the gravity, in addition to a variable force, which is proportional to the acceleration. Therefore, there is a constant positional shift in the movable electrodes 24 due to the gravity along the directions Y. For example, when the sensor in FIG. 6 is mounted such that the directions Y become vertical to the ground while the lower side of the supporting substrate 11 in FIG. 6, on which electrode pads 25a, 31a, 41a are located, become more distant from the ground than the upper side thereof, the left clearance d1' increases, and the left capacitance CS1 decreases. At the same time, the right clearance d2' decreases, and the capacitance CS2 increases.

As a result, when an acceleration vertical to the ground is measured, the capacitance difference corresponding to the gravity is included in the output from the sensor in addition to the capacitance difference corresponding to the acceleration. If the acceleration is comparable in magnitude to the gravity, the margin of error in measurement results is not negligible. Moreover, the output can be susceptible to errors or would be saturated if the capacitance difference corresponding to the gravity is out of the detection range of the proposed sensor.

The proposed sensor would be susceptible to the same problem as long as the proposed sensor is under a constant force such as the gravity along the directions Y, or the movement directions of the movable member 20, when in use.

SUMMARY OF THE INVENTION

The present invention has been made in view of the above aspects with an object to address the above-described issue with the proposed capacitive acceleration sensor.

A capacitive acceleration sensor according to the present invention includes a supporting substrate, a movable member, and two fixed members. The movable member is located above a surface of the supporting substrate and supported by the supporting substrate to move with respect to the supporting substrate along predetermined directions parallel to the surface in response to a force that acts on the movable member along the predetermined directions. Each fixed member is located above the surface and supported by the supporting substrate to be stationary with respect to the supporting substrate under the force.

Two capacitances are formed between the movable member and the fixed members. One of the capacitances increases while the other decreases when the movable member moves in response to the force. The force includes a substantially constant force and a variable force when an acceleration is measured using the sensor. The variable force is proportional to the acceleration. The acceleration is measured on the basis of a difference in quantity between the capacitances. The capacitances are different in quantity from each other when the force that acts on the movable member is zero to reduce a difference in quantity between the capacitances that corresponds to the substantially constant force.

As a result, it is possible to reduce substantially down to zero the difference in quantity between the capacitances that corresponds to the substantially constant force. Therefore, the capacitive acceleration sensor according to the present invention is capable of measuring appropriately an acceleration even if the movable member is under a constant force along the predetermined directions, or the movement directions of the movable member, when in use.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be described in detail with reference to various embodiments.

Figure 1:
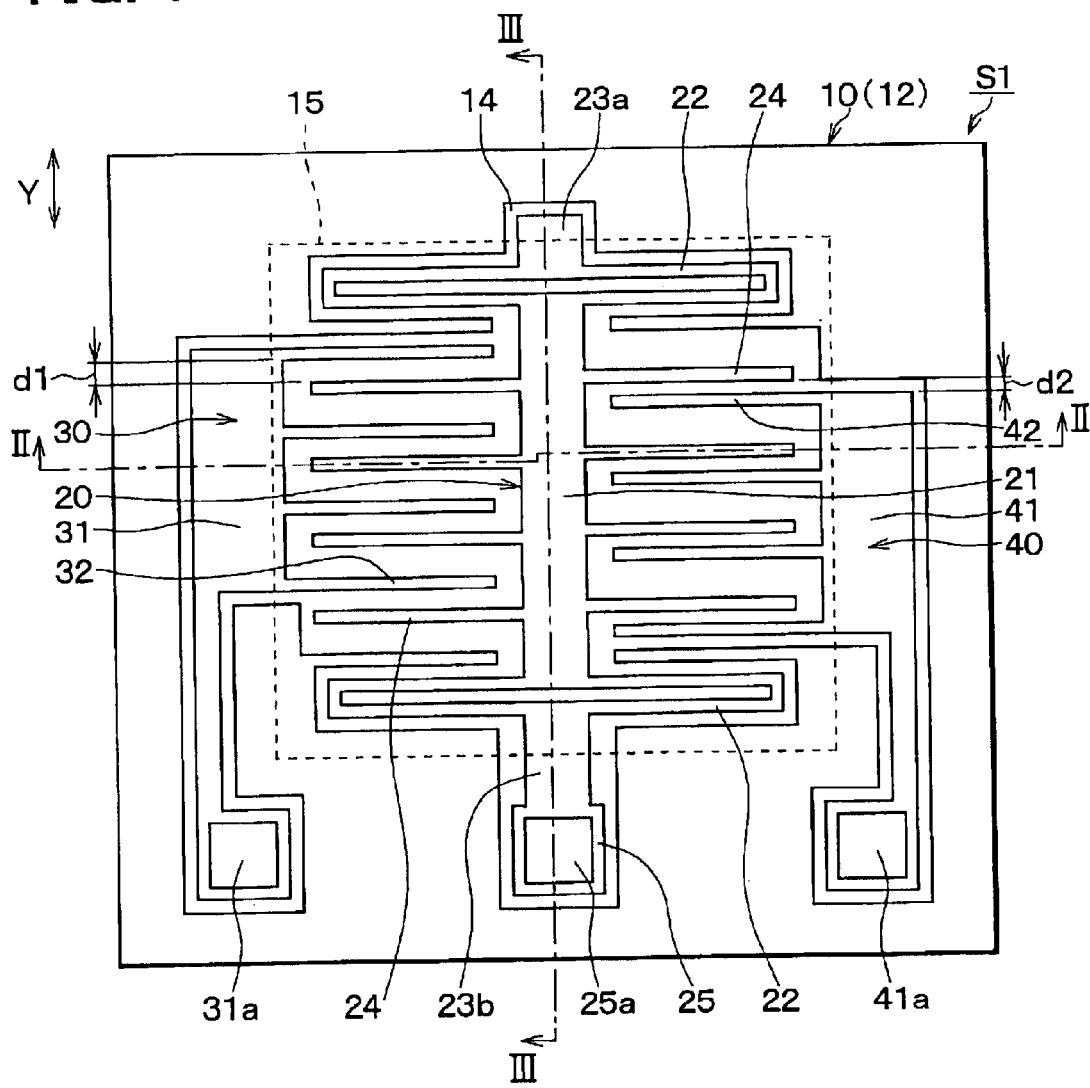
FIG. 1 is a plan view of a semiconductor acceleration sensor according to an embodiment of the present invention.
Figure 2:
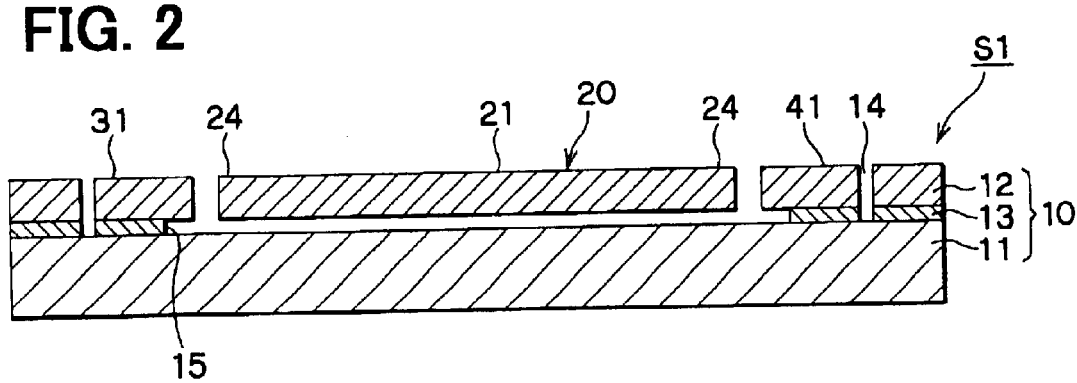
FIG. 2 is a cross-sectional view of the sensor in FIG. 1 taken along the line II—II in FIG. 1.
Figure 3:
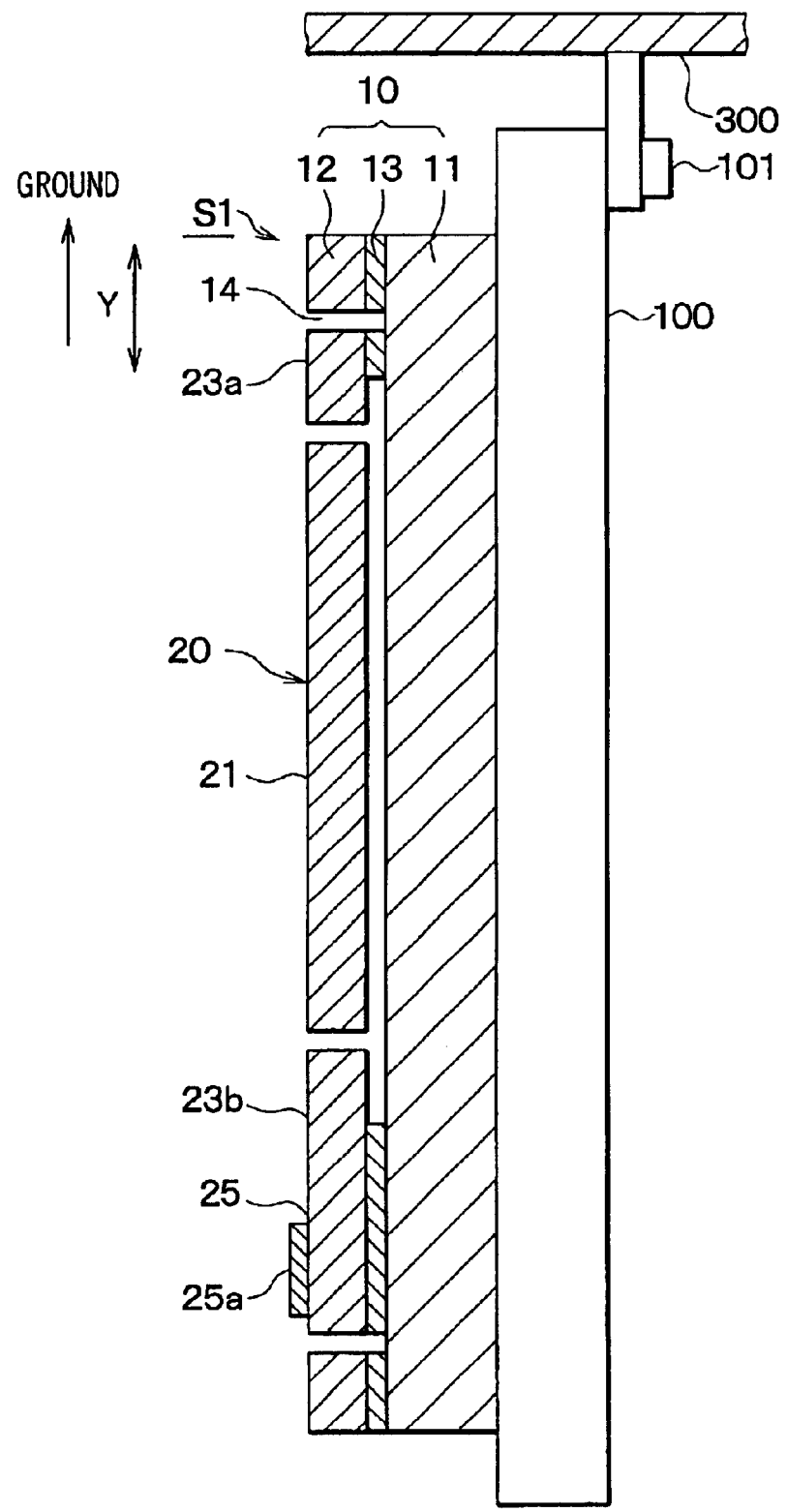
FIG. 3 shows the cross-section of the sensor in FIG. 1 taken along the line III—III in FIG. 1 in the state that the sensor attached to an ECU case and mounted on an automobile.

A semiconductor acceleration sensor S1 in FIG. 1 can be mounted in, for example, an automobile and used for measuring an acceleration of the automobile along the directions vertical to the ground. The sensor S1 is formed, for example, by micromachining a semiconductor substrate using a known micromachining process. As shown in FIGS. 2 and 3, the sensor S1 includes a rectangular silicon-on-insulator (SOI) substrate 10. The SOI substrate 10 includes a silicon supporting substrate 11, a silicon active layer 12, and a silicon oxide insulating layer 13. The insulating layer 13 is located between the supporting substrate 11 and the active layer 12

The active layer 12 includes a movable member 20 and fixed members 30, 40, which are separated from one another by has a trench 14. As shown in FIGS. 1 and 2, the insulating layer 13 has a rectangular opening 15 below the movable member 20. The above structure of the sensor S1 can be achieved, for example, as follows. Firstly, a silicon layer, from which the active layer 12 is formed, is masked except the area where the trench 14 is formed using photolithography. Then, the silicon layer is dry etched using a gas such as $CF_4$ or $SF_5$ to form the trench 14. Next, a silicon oxide layer, from which the insulating layer 13 is formed, is partially etched through the trench 14 using, for example, hydrofluoric acid to form the opening 15.

As illustrated in FIG. 1, the movable member 20, which spans over the opening 15, includes a rectangular weight 21. Spring members 22 are located at upper and lower ends of the weight 21 to link the weight 21 to anchors 23a, 23b. The anchors 23a, 23b are fixed to the frame-like portion of the insulating layer 13, which defines the opening 15, to be supported by the supporting substrate 11.

Each of the spring members 22 includes two substantially parallel beams. The two beams of each spring members 22 are linked together on both ends in the longitudinal direction of the two beams to form a frame-like spring that expands and shrinks orthogonally to the longitudinal directions. Specifically, the spring members 22 allow the movable member 20 to move with respect to the supporting substrate 11 along the directions Y in FIG. 1 in response to a force that acts on the movable member 20 along the directions Y. Therefore, the movable member 20 moves along the predetermined directions Y when the movable member 20 is accelerated along the directions Y and moves back to the original position when the acceleration becomes zero.

The movable member 20 also includes two comb-shaped movable electrodes 24. The movable electrodes 24 are respectively located on left and right ends of the weight 21 in FIG. 1. The movable electrodes 24 are mechanically and electrically linked to the weight 21. Therefore, the movable electrodes 24 move with the weight 21 along the predetermined directions Y in response to the acceleration of the sensor. As shown in FIG. 1, each movable electrode 24 includes four substantially-straight movable electrode beams 24. The left movable electrode beams 24 and the right movable electrode beams 24 jut out in the opposite direction to be orthogonal to the direction Y. Each movable electrode beam 24 has a rectangular cross-section in the direction Y.

On the other hand, as shown in FIG. 1, each fixed member 30, 40 includes a comb-shaped fixed electrode 32, 42, which is interleaved with each corresponding movable electrode 24. The fixed members 30, 40 are fixed to the frame-like portion of the insulating layer 13, which defines the opening 15, to be supported by the supporting substrate 11 at the left and right sides thereof in FIG. 1. In FIG. 1, the left fixed member 30 and the right fixed member 40 are electrically isolated from each other.

Each fixed member 30, 40 also includes a wiring portion 31, 41, at which each fixed member 30, 40 is fixed to the frame-like portion to be supported by the supporting substrate 11. Each fixed electrode 32, 42 is mechanically and electrically linked to each corresponding wiring portion 31, 41. Each fixed electrode 32, 42 includes four substantially-straight fixed electrode beams 32, 42. As shown in FIG. 1, the left fixed electrode beams 32 and the right fixed electrode beams 42 jut out in the opposite direction to be orthogonal to the direction Y. Each fixed electrode beams 32, 42 has a rectangular cross-section in the direction Y.

As shown in FIG. 1, there is a left clearance d1 between the left movable electrode 24 and the left fixed electrode 32, more specifically between each left movable electrode beam 24 and the corresponding left fixed electrode beam 32, and a left capacitance CS1 is formed between the left movable electrode 24 and the left fixed electrode 32. On the other hand, there is a right clearance d2 between the right movable electrode 24 and the right fixed electrode 42, more specifically between each right movable electrode beam 24 and the corresponding right fixed electrode beam 42, and a right capacitance CS2 is formed between the right movable electrode 24 and the right fixed electrode 42.

As shown in FIG. 1, the upper three left movable electrode beams 24 face the lower three left fixed electrode beams 32 with another left clearance greater than the left clearance d1 to form another left capacitance between the left movable electrode 24 and the left fixed electrode 32. However, the another left capacitance is so smaller than the left capacitance CS1 that it is negligible. Similarly, the lower three right movable electrode beams 24 face the upper three right fixed electrode beams 32 with another right clearance larger than the right clearance d2 to form another right capacitance between the right movable electrode 24 and the right fixed electrode 42. However, the another right capacitance is so smaller than the right capacitance CS2 that it is negligible.

In FIG. 1, each left movable electrode beam 24 is located under each corresponding left fixed electrode beams 32. On the other hand, each right movable electrode beam 24 is located above each corresponding right fixed electrode beams 32 in FIG. 1. Therefore, when the movable electrodes 24 move along the directions Y in response to a force that acts on the movable member 20 along the directions Y, the capacitances CS1, CS2 change in a manner that one of the capacitances CS1, CS2 increases while the other decreases. Moreover, the force can be correlated to an acceleration of the sensor S1 along the directions Y. Therefore, the acceleration can be measured based on the difference (CS1−CS2) between the capacitances CS1, CS2.

A fixed electrode pad 31a, 41a for wire bonding is located at a predetermined position on each wiring portion 31, 41 of the fixed members 30, 40. Each fixed electrode pad 31a, 41a is electrically connected to each corresponding fixed electrode 32, 42 through each corresponding wiring portion 31, 41. As shown in FIG. 1, a movable electrode wiring portion 25, which includes one of the anchors 23b as a part thereof, is mechanically and electrically linked to one of the spring members 22. A movable electrode pad 25a for wire bonding is located at a predetermined position on the wiring portion 25. The movable electrode pad 25a is electrically connected to the movable electrodes 24 through one of the spring members 22 and the weight 21. The electrode pads 25a, 31a, 41a are made of, for example, aluminum.

When an acceleration is measured using the sensor, the force that acts on the movable member 20 along the directions Y includes a substantially constant force, which is caused by, for example, the gravity, in addition to a variable force, which is proportional to the acceleration. For example, in FIG. 3, the sensor S1 is mounted on a circuit substrate 100 using, for example, an adhesive pasted at the back side of the supporting substrate 11, or at the side opposite to the insulating layer 13. The circuit substrate 100 includes a detection circuit 200, which is described later. The circuit substrate 100 is electrically connected to the electrode pads 25a, 31a, 41a by, for example, wire bonding using gold or aluminum wires.

The circuit substrate 100 is fixed to an ECU case 300 using, for example, a screw 101. The ECU case 300 is mounted on an automobile, the acceleration of which is measured using the sensor S1, such that the directions Y, along which the movable member 20 moves, is vertical to the ground while the lower side of the sensor 1 in FIG. 1, on which electrode pads 25a, 31a, 41a are located, become more distant from the ground than the upper side thereof. Therefore, in the automobile, the gravity is constantly acts on the movable member 20 along the directions Y as the substantially constant force.

When the sensor S1 mounted on the automobile is accelerated synchronously with the automobile, the movable electrodes 24 move along the direction Y in response to the acceleration of the movable member 20 with the spring-like action of the spring members 22, and, as described, the capacitances CS1, CS2 change in a manner that one of the capacitances CS1, CS2 increases while the other decreases. Therefore, the acceleration of the automobile can be measured based on the difference (CS1−CS2) between the capacitances CS1, CS2.

Figure 4:
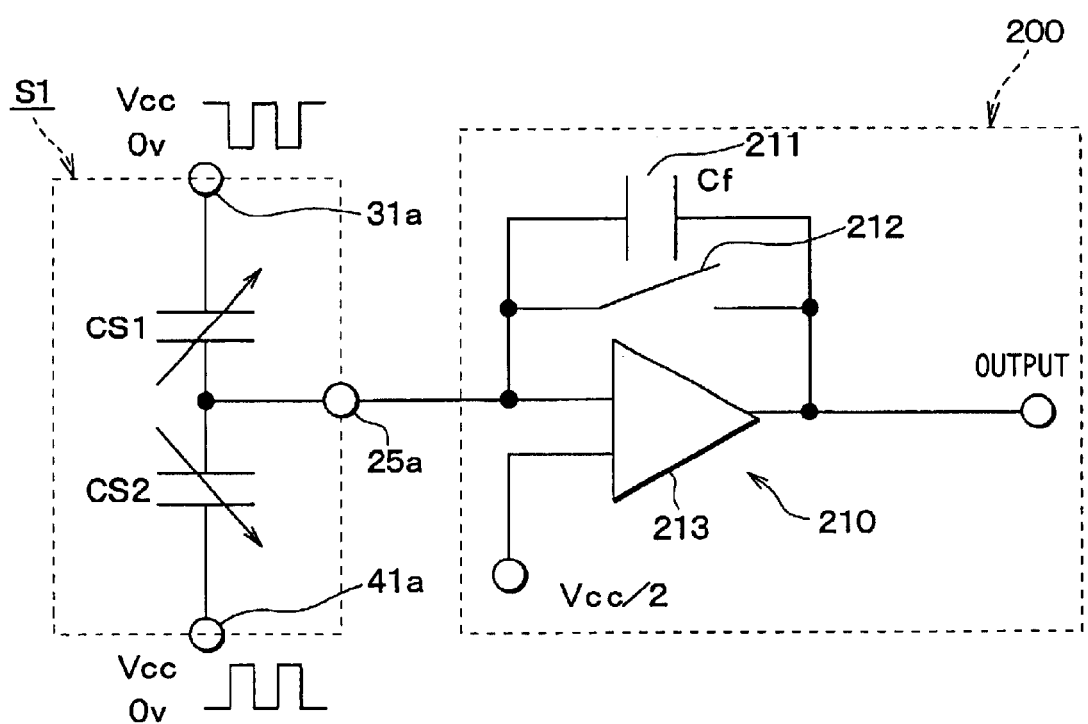
FIG. 4 is a circuit diagram for a detection circuit for the sensor of FIG. 1.

As shown in FIG. 4, the sensor S1 includes a detection circuit 200. The detection circuit 200 includes a switched capacitor circuit 210, or an SC circuit 210. The SC circuit 210 includes a capacitor 211 having a capacitance Cf, a switch 212, and a differential amplifier circuit 213 to convert the capacitance difference (CS1−CS2) into voltage difference.

In the sensor S1, for example, a carrier wave 1 having amplitude Vcc is inputted from the fixed electrode pad 31a, and a carrier wave 2 having amplitude Vcc, the phase of which is off by 180° from the carrier wave 1, is inputted from the fixed electrode pad 41a. The switch 212 in the SC circuit 210 is turned on and off with predetermined timing. The detection circuit 200 outputs the voltage V0 in response to the acceleration. The voltage V0 is expressed in Eq. 1.

$$V0 = (CS1 - CS2) \times Vcc / Cf \qquad (\text{Eq. 1})$$

The sensor S1 of FIG. 3 is mounted on an automobile to measure the acceleration substantially vertical to the ground, so the gravity constantly acts on the movable member 20 along the directions Y, or the direction along which the movable member 20 can move with respect to the supporting substrate 11. If the movable electrodes 24 move with the movable member 20 upward in FIG. 1 along the direction Y by Δd due to the gravity, the left clearance d1 between the left movable electrode 24 and the left fixed electrode 32 becomes narrower by Δd, while the right clearance d2 between the right movable electrode 24 and the right fixed electrode 42 becomes wider by Δd.

In the sensor S1 of FIG. 1, the clearances d1, d2 when the force that acts on the movable member 20 along the directions Y is zero are designed such that the clearances d1, d2 are substantially equal to each other when the force includes only the gravity as the substantially constant force. In other words, the clearances d1, d2 when the force is zero is compensated by Δd. More specifically, if the clearances d1, d2 when the force includes only the gravity are expressed in d0, the left and right clearances d1, d2 are respectively (d0+Δd) and (d0−Δd) when the force is zero.

As described above, it is possible to equalize the clearances d1, d2 when the force includes only the gravity by differentiating the clearances d1, d2 when the force is zero by Δd. As a result, it is possible to reduce substantially down to zero the difference between the capacitances corresponding to the gravity. Thus, it is possible to eliminate the component corresponding to the gravity from the sensor output when the sensor is in use.

Therefore, the sensor S1 of FIG. 1 is capable of measuring appropriately acceleration even if the gravity constantly acts on the movable member 20 along the directions Y when the sensor S1 is in use.

In the sensor S1 of FIG. 1, the clearances d1, d2 are different in dimension from each other when the force is zero such that the clearances d1, d2 are substantially equal to each other when the force includes only the gravity. However, as long as the difference between clearances d1, d2 when the force includes only the gravity is smaller than (2×Δd), which is the difference between clearances d1, d2 corresponding to the gravity, the component corresponding to the gravity in the sensor output is reduced when the sensor is in use.

Other Embodiments

In the above example, the sensor S1 of FIG. 1 is used in the state that the gravity constantly acts on the movable member 20 along the directions Y, or the direction along which the movable member 20 can move with respect to the supporting substrate 11. The sensor S1, however, may be used in the state that the gravity constantly acts on the movable member 20 diagonally to the directions Y. In that state as well, the movable member 20 is constantly under an substantially constant force related to the gravity along the direction Y, although the substantially constant force is smaller than 1G.

Furthermore, the sensor S1 may be used in the state that another substantially constant force acts on the movable member 20 along the directions Y in addition to the gravity. For example, when the sensor S1 is applied to a moving object such as a rocket that substantially constantly accelerates over a long period of time, another substantially constant force can act on the movable member 20 along the directions Y.

Figure 5:
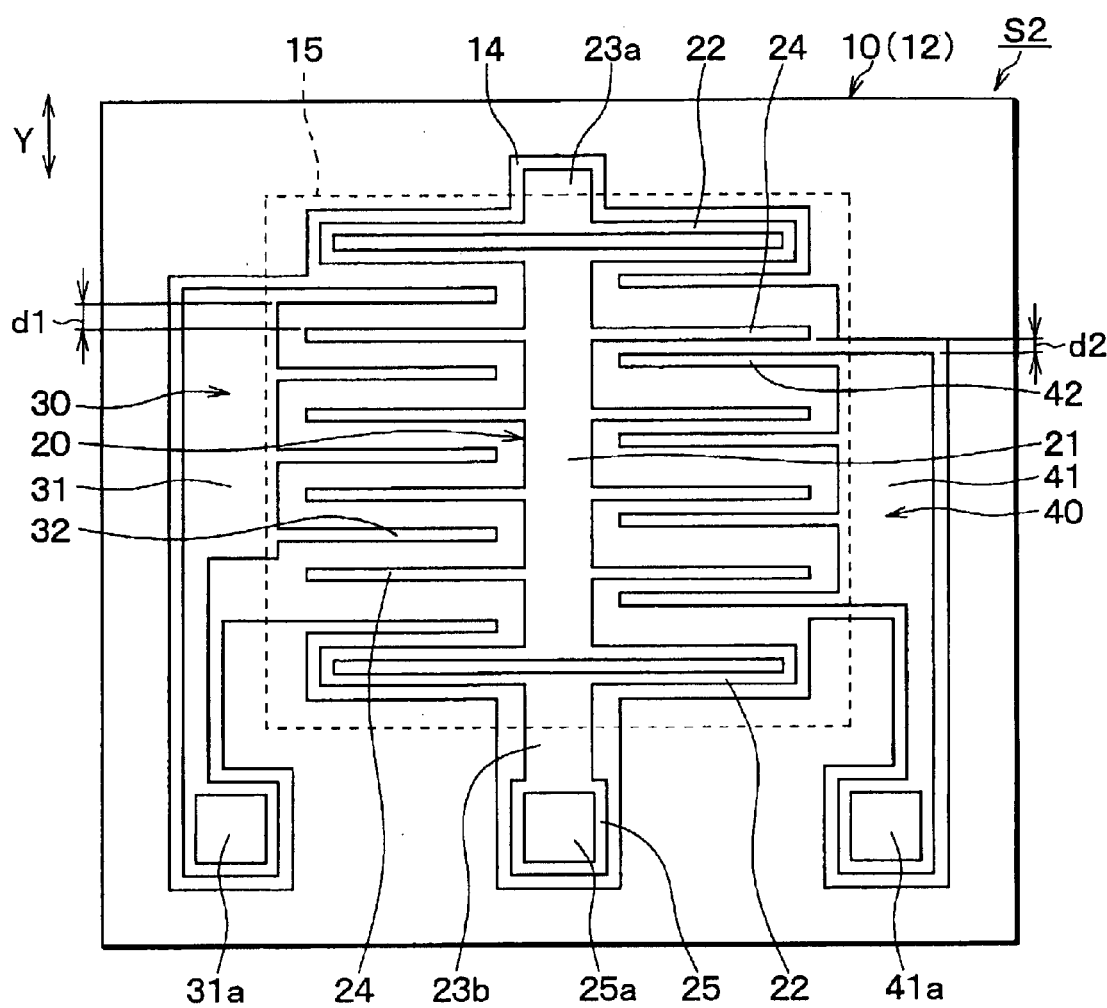
FIG. 5 is a plan view of a semiconductor acceleration sensor according to another embodiment of the present invention.
Figure 6:
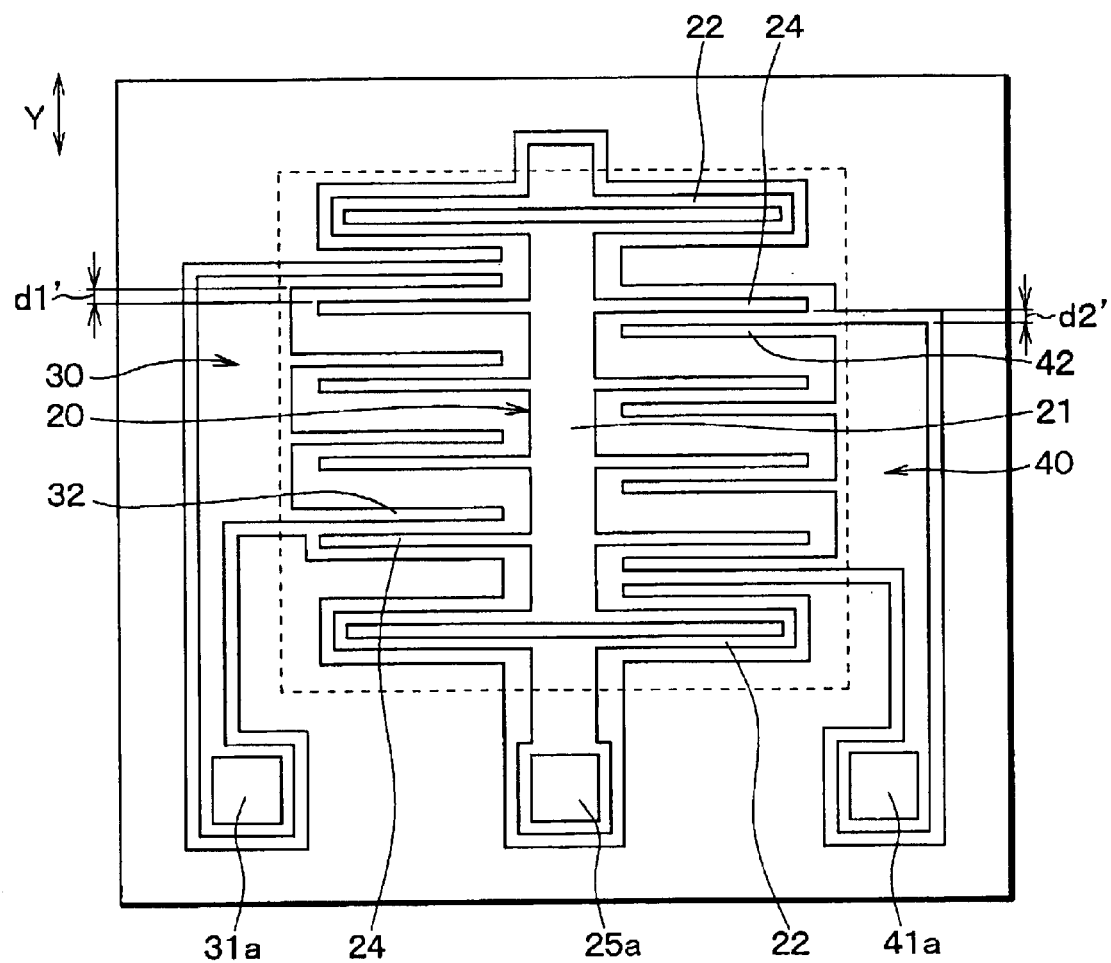
FIG. 6 is a plan of a proposed capacitive acceleration sensor.

In the sensor S1 of FIG. 1, the clearance shift Δd corresponding to the gravity is compensated by shifting the positions of the movable electrodes 24 along the direction Y in comparison with the proposed sensor of FIG. 6. However, as in the sensor S2 of FIG. 5, the clearance shift Δd may be compensated by shifting the positions of the fixed electrodes 32, 42 along the direction Y in comparison with the proposed sensor of FIG. 6. In the sensor S2 of FIG. 5 as well, the clearances d1, d2 when the force that acts on the movable member 20 along the directions Y is zero are designed such that the clearances d1, d2 are substantially equal to each other when the force includes only the gravity as the substantially constant force.

Furthermore, in the sensor S1 of FIG. 1, the capacitances CS1, CS2 are located at the opposite end of the weight 21. The capacitances CS1, CS2, however, may be formed at the same end of the weight 21. For example, the electrode arrangement shown in FIG. 2C in the U.S. Pat. No. 5,847, 280 may be applied to form a pair of the capacitances CS1, CS2 respectively at two ends of the weight 21.

What is claimed is:

1. A capacitive acceleration sensor comprising:
   a supporting substrate;
   a movable member, which is located above a surface of the supporting substrate, wherein the movable member is supported by the supporting substrate to move with respect to the supporting substrate along predetermined directions parallel to the surface in response to a force that acts on the movable member along the predetermined directions;
   a first fixed member;
   a second fixed member, wherein each fixed member is located above the surface of the supporting substrate, wherein each fixed member is supported by the supporting substrate to be stationary with respect to the supporting substrate under the force, wherein a first capacitance is formed between the movable member and the first fixed member and a second capacitance is formed between the movable member and the second fixed member, wherein one of the capacitances increases while the other capacitance decreases when the movable member moves in response to the force, wherein the force includes a substantially constant force and a variable force when an acceleration is measured using the sensor, wherein the variable force is proportional to the acceleration, wherein the acceleration is measured on a basis of a difference in quantity between the capacitances, wherein the capacitances are different in quantity from each other when the force that acts on the movable member is zero to reduce a difference in quantity between the capacitances that corresponds to the substantially constant force, wherein during operation in a mounted state, the movable member is vertical to or at a slant with respect to ground, and a first electrode clearance between the first fixed member and the movable member is substantially equal to a second electrode clearance between the second fixed member and the movable member, and wherein during non-operation in a non-mounted state, the first electrode clearance is different than the second electrode clearance.

2. The capacitive acceleration sensor in claim 1, wherein the capacitances are different in quantity from each other when the force that acts on the movable member is zero to substantially completely eliminate the difference in quantity between the capacitances that corresponds to the substantially constant force.

3. The capacitive acceleration sensor in claim 1, wherein the surface of the supporting substrate is vertical to or at a slant with respect to a ground such that the substantially constant force is caused by a gravity when the acceleration is measured.

4. The capacitive acceleration sensor in claim 1, wherein the first fixed member includes a first comb-shaped fixed electrode, wherein the second fixed member includes a second comb-shaped fixed electrode, wherein the movable member includes a weight, a first comb-shaped movable electrode, and a second comb-shaped movable electrode, wherein the movable electrodes are mechanically and electrically connected to two ends of the weight, wherein the first movable electrode and the first fixed electrode are interleaved with each other with a first clearance to form the first capacitance, wherein the second movable electrode and the second fixed electrode are interleaved with each other with a second clearance to form the second capacitance, wherein during non-operation in a non-mounted state, the first and second clearances are different in dimension from each other when the force that acts on the movable member is zero to reduce a difference between the first and second clearances that corresponds to the substantially constant force, and wherein during operation in a mounted state, the movable member is vertical to or at a slant with respect to ground, and the first clearance is substantially equal to the second clearance.

5. The capacitive acceleration sensor in claim 4, wherein the first and second clearances are different in dimension from each other when the force that acts on the movable member is zero to substantially completely eliminate the difference in quantity between the first and second clearances that corresponds to the substantially constant force.

6. The capacitive acceleration sensor in claim 4, wherein the surface of the supporting substrate is vertical to or at a slant with respect to a ground such that the substantially constant force is caused by a gravity when the acceleration is measured.

7. The capacitive acceleration sensor in claim 1, wherein the difference in quantity between the first and second capacitances is zero during operation.

8. The capacitive acceleration sensor in claim 1, wherein the movable member further comprises a spring member supported by the supporting substrate, a weight suspended by the spring member, and a movable electrode pad located on a lower side of the supporting substrate and electrically connected to the movable member through one of the spring member and the weight, wherein the movable electrode pad is more distant from the ground than an upper side of the supporting substrate.

9. The capacitive acceleration sensor in claim 8, wherein the first and second capacitances are formed on opposite sides of the weight.

10. The capacitive acceleration sensor in claim 8, wherein the first and second electrode clearances are formed on opposite sides of the weight.

11. A capacitive acceleration sensor, comprising:

a semiconductor substrate having an opening;

a weight supported by the semiconductor substrate and having movable electrodes located on opposite sides of the weight and disposed at a predetermined distance above the semiconductor substrate to span over the opening, wherein the weight is movable with respect to the semiconductor substrate along a direction parallel to a surface thereof in response to a force acting thereon; and fixed electrodes disposed on the semiconductor substrate to and interleaved with the movable electrodes so that capacitances are formed between the fixed electrodes and the movable electrodes, and clearances are formed between the fixed electrodes and the movable electrodes, wherein during operation in a mounted state, the weight is vertical to or at a slant with respect to ground, and a first electrode clearance between a first fixed electrode and a first movable electrode is substantially equal to a second electrode clearance between a second fixed electrode and a second movable electrode, and during non-operation in a non-mounted state, the first electrode clearance is different than the second electrode clearance.

12. The capacitive acceleration sensor in claim 11, wherein the capacitances are different in quantity from each other when the force that acts on the weight is zero to substantially completely eliminate a difference in quantity between the capacitances that corresponds to the force.

13. The capacitive acceleration sensor in claim 11, wherein the surface of the semiconductor substrate is vertical to or at a slant with respect to a ground.

14. The capacitive acceleration sensor in claim 11, wherein the first fixed electrode includes a first comb-shaped fixed electrode, the second fixed electrode includes a second comb-shaped fixed electrode, the weight includes a first comb-shaped movable electrode and a second comb-shaped movable electrode, the movable electrodes are mechanically and electrically connected to two ends of the weight.

15. The capacitive acceleration sensor in claim 14, wherein the first and second clearances are different in dimension from each other when the force that act on the weight is zero to substantially completely eliminate the difference in quantity between the first and second clearances that corresponds to the force.

16. The capacitive acceleration sensor in claim 14, wherein the surface of the semiconductor substrate is vertical to or at a slant with respect to ground such that the force is caused by gravity when the acceleration is measured.

17. The capacitive acceleration sensor in claim 11, wherein the difference in quantity between the capacitances is zero during operation.

18. The capacitive acceleration sensor in claim 11, wherein the movable member further comprises a spring member supported by the semiconductor substrate, the weight being suspended by the spring member, and a movable electrode pad located on a lower side of the supporting substrate and electrically connected to the movable member through one of the spring member and the weight, wherein the movable electrode pad is more distant from the ground than an upper side of the semiconductor substrate.

19. The capacitive acceleration sensor in claim 14, wherein the first and second capacitances are formed on opposite sides of the weight.

20. The capacitive acceleration sensor in claim 14, wherein the first and second clearances are formed on opposite sides of the weight.

* * * * *